United States Patent [19]

Leitner

[11] 4,033,326

[45] July 5, 1977

[54] INFLATABLE SOLAR COLLECTOR FOR SWIMMING POOL

[76] Inventor: Lionel J. Leitner, Egbert Hill, Morristown, N.J. 07960

[22] Filed: Feb. 23, 1976

[21] Appl. No.: 660,331

[52] U.S. Cl. ............................. 126/271; 4/172.12; 9/11 A
[51] Int. Cl.² ........................................... F24J 3/02
[58] Field of Search ............. 126/270, 271; 9/11 A; 4/172, 172.12; 220/216, 218

[56] References Cited

UNITED STATES PATENTS

| | | | |
|---|---|---|---|
| 3,072,920 | 1/1963 | Yellott | 126/271 |
| 3,415,719 | 12/1968 | Telkes | 9/11 A |
| 3,893,443 | 7/1975 | Smith | 126/271 |
| 3,949,095 | 4/1976 | Pelehach | 126/271 |

*Primary Examiner*—Kenneth W. Sprague
*Assistant Examiner*—James C. Yeung

[57] ABSTRACT

An inflatable solar collector for heating a swimming pool comprising:
  a plurality of individual solar heating sections;
  each of the sections having an upper portion which is transparent or translucent and a lower portion having an internal surface which absorbs solar energy, the lower portion being connected to the upper portion to provide a substantially enclosed intermediate dead air space;
  the sections having a major plane which is substantially parallel to the surface of the water in the pool when the collector is floating on the water;
  when inflated, the upper portions intersecting the plane at at least two locations such that the angles formed by the intersections of the upper surface with the plane is about 40° to 70°;
  a plurality of tabs interconnecting the sections and providing air passageways therebetween; and
  inflating means to permit the sections to become inflatable by gas pressure, the collector being floatable on the water surface when inflated.

10 Claims, 5 Drawing Figures

INFLATABLE SOLAR COLLECTOR FOR SWIMMING POOL

BACKGROUND OF THE INVENTION

1. Field of the Invention

This invention relates to solar collectors, and more particularly to solar collectors useful for heating swimming pools.

2. Description of the Prior Art

Swimming pool heaters have of course been heretofore employed to provide for extended utilization of the pool especially during the spring and fall seasons. However, the increasingly high costs of and the large amounts of fuel necessary to heat an average size home swimming pool are higher than many pool owners can afford. In order to overcome such problems, various inexpensive swimming pool heating devices have been heretofore suggested which rely upon solar energy.

U.S. Pat. No. 3,893,443 to Smith, for example, describes a floating solar pool heater which is in the form of individual shallow pans that are intended to be floated on the surface of the water. As envisioned by the Smith patent, the pan includes a flat upper transparent or translucent cover formed of glass or plastic, a flat bottom wall formed of aluminum or reinforced plastic which is provided with a blackened surface to absorb the solar rays, and an intermediate dead air space. However, the pans suggested by this patent are not efficiently designed and require considerable storage space when not in use.

It has also been heretofore suggested in U.S. Pat. No. 3,072,920 to Yellot to provide a swimming pool cover to collect or reflect solar heat depending upon the season. Yellot's device comprises a composite laminated inflatable structure which in its solar collecting position includes a flat transparent upper surface, a darkened internal lower surface, an intermediate air space and a plurality of bottom layers. A device of this type is bulky to handle and store, precludes use of the pool when the water is being heated and also does not efficiently utilize solar energy as the source of heat.

Other more elaborate swimming pool heaters are disclosed, for example, in U.S. Pat. No. 2,996,729; 3,076,450; 3,411,163; 3,453,666 and 3,598,104. Other patents describe devices useful for heating water internally; such patents include U.S. Pat Nos. 3,022,781; 3,029,806 and 3,077,190.

It would be desirable if there were provided a relatively inexpensive and efficient swimming pool heater which relied upon solar energy, was lightweight and easily storable and could be used simultaneously with utilization of the pool for swimming.

SUMMARY OF THE INVENTION

In accordance with my invention, there is provided an inflatable solar collector for heating a swimming pool comprising:

a plurality of individual solar heating sections;

each of the sections having an upper portion which is transparent or translucent and a lower portion having an internal surface which absorbs solar energy, the lower portion being connected to the upper portion to provide a substantially enclosed intermediate dead air space;

The sections having a major plane which is substantially parallel to the surface of the water in the pool when the collector is floating on the water;

when inflated, the upper portions intersecting the plane at at least two locations such that the angles formed by the intersections of the upper surface with the plane are about 40° to 70°;

a plurality of tabs interconnecting the sections and providing air passageways therebetween; and inflating means to permit the sections to become inflatable by gas pressure, the collector being floatable on the surface of the water when inflated.

The collectors of this invention are passive devices which utilize solar energy be means of the "greenhouse effect" to heat the pool water by conduction and convection. The collectors are of relatively inexpensive (preferably plastic) construction, are lightweight and easily storable when not in use, are highly efficient in absorbing the available solar energy due to the positioning of the upper surfaces and, since they have substantially smaller dimension than the pool, can be used to heat the pool without interfering with swimming. Preferably, the collector also comprises positioning means capable of securing the collector at a desired location on the water surface. Thus, the collectors can be readily moved and positioned on the pool surface to properly align the absorbing surface with the incident solar rays.

DESCRIPTION OF THE PREFERRED EMBODIMENTS

Figure 1:
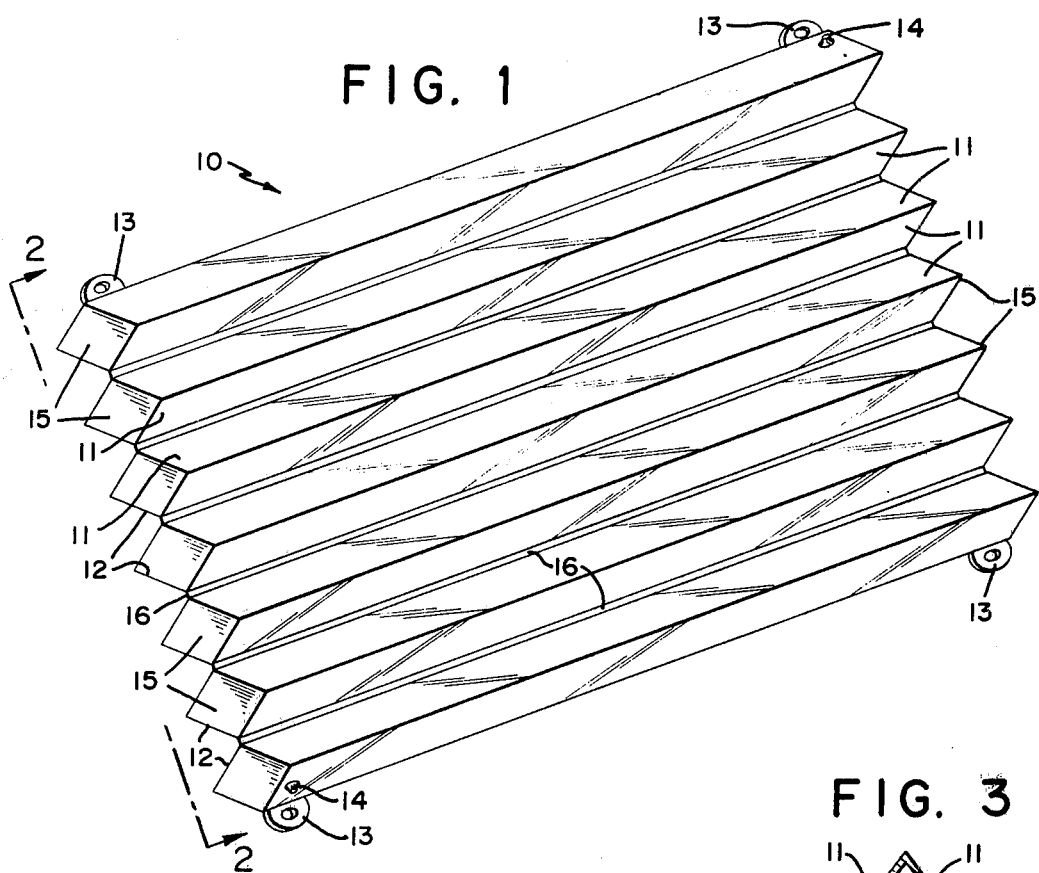
FIG. 1 is a perspective view of the solar collector of this invention.
Figure 2:
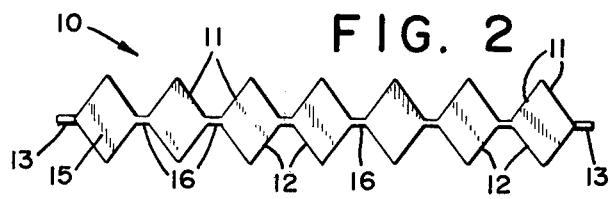
FIG. 2 is a cross-sectional view of the collector along line 2—2 of FIG. 1.
Figure 3:
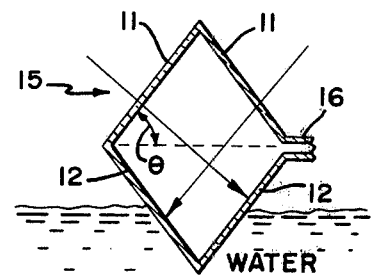
FIG. 3 is a fragmentary enlarged cross-sectional view of one section 15 of the collector.

In the embodiment of the invention illustrated in the drawings, there is shown in FIGS. 1–3 a raft-like solar collector 10 useful for heating the water in a swimming pool. Collector 10 is formed of individual sections 15 which are interconnected by tabs 16 which provide air passageways between adjacent sections. Each section 15 is formed of an upper portion 11 and a lower portion 12 which are joined to each other directly (in the case of end sections) or which are joined through tabs 16. Upper portion 11 is formed of a transparent or translucent material which permits solar rays (depicted as the arrows in FIG. 3) to penetrate through the upper portion and intersect with the inner surface of the lower portion 12. Such inner surface is capable of absorbing the solar energy and for this purpose preferably has a black or other dark color. The inner surface is also preferably formed with a matte surface to reduce the amount of rays which are reflected by the surface. Such reflection would reduce the heating effect of the collector. The inner surface may be painted or otherwise formed on lower portion 12 or may be formed integral therewith such as by extrusion in the case of plastics or by other means.

Preferably, both the upper and lower portions are formed of plastic sheets or the like since such materials are easily formable to the desired shape. The sheets may be attached to each other at least along the longitudinal edges by conventional means such as heat sealing, adhesives, etc. The plastic should of course be substantially impermeable to water and compatible therewith. Among such plastic materials are thermoplastics and thermosetting plastics such as polyvinyl chloride, polyesters, nylon, polyolefins, polyacrylates and polymethacrylates and the like. Preferably, the plastics contain stabilizers to reduce fading. Although plastics are the preferred material for the top and bottom portions, other materials may alternatively be utilized. For example, the bottom portion may be formed of rubber, aluminum, etc.

Each section 15 has a major plane (shown in dotted lines in FIG. 3) which, when the collector is floating on the water surface, is substantially parallel to such surface. Both upper portion 11 and lower portion 12 intersect the plane at at least two points. The intersections of upper portion 11 with the plane forms angle $\theta$ as shown in FIG. 3. This angle is selected to be in the range of about 40° to 70° and most preferably is about 50° to 60° when the collector is inflated. By selecting the intersecting angle to be in such range, the solar energy absorbing capacity of the collector is maximized since the resultant elevation of upper portion 11 permits solar rays to enter the collector and be absorbed on the darkened surface at almost any position of the sun relative to the collector. The sections of lower portion 12 adjacent to such plane are preferably substantially parallel to the opposing sections of upper portion 11 which intersect the plane.

Figure 4:
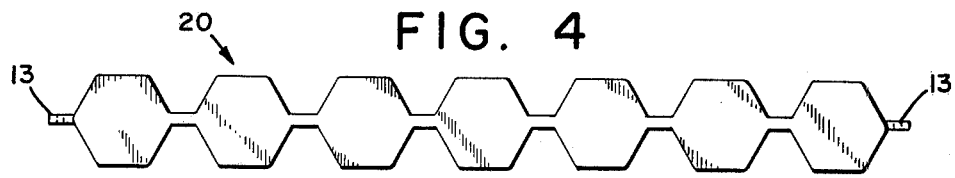
FIG. 4 is a cross-sectional view of a modified form of the collector.
Figure 5:
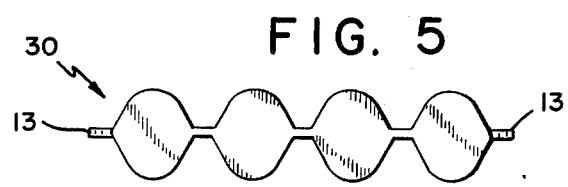
FIG. 5 is a cross-sectional view of another modified form of the collector.

The individual sections 15 may be of any desired configuration (so long as the angular relationship described above is satisfied) and in the embodiment of FIGS. 1–3 the upper and lower portions have generally triangular shapes. As seen in FIG. 4, solar collector 20 may be formed of upper and lower portions which have shapes resembling truncated cones, and in FIG. 5, collector 30 is shown with generally hemispherical upper and lower portions.

As stated above, the solar collectors of this invention are inflatable by means of gas pressure. For this purpose, one or more air valves 14 may be provided in the collector. Thus, each individual collector may be blown up in a manner similar to inflatable swimming rafts. When inflated, the shape of individual sections 15 is of course maintained by internal gas pressure. When deflated, the thickness of the collector is substantially reduced so as to facilitate storage and handling.

Preferably, the collectors are also provided with positioning means which are capable of securing the collector at a desired location on the surface of the water in the pool. As shown in the drawings, such positioning means may comprise eyelets 13 preferably formed at each corner of the collector. In use, one or more lengths of rope or the like are attached to the eyelet(s) and are fastened against the edge of the pool or to another stationary object so that the collector's position is relatively fixed on the water. Other positioning means including mechanical or passive devices, may alternatively be utilized. The collectors are thus movable and positionable at any desired location in the pool and they may be readily moved from time to time to follow the position of the sun's rays to obtain maximum use of available solar energy.

Since the collectors are usually many times smaller than the pool (a typical preferred collector size being about four by eight feet), the solar collectors can be utilized to heat the pool water without interfering with desired use of the pool. Of course, more than one collector may be used to heat the pool water to a desired temperature. In addition, since the collectors are floatable and are inflated when in use, they can also be used as swimming rafts.

It can be seen that the collectors of this invention provide an efficient and relatively inexpensive means of heating a swimming pool. Moreover, the collectors are lightweight, can be easily stored and handled, and do not preclude enjoyment of the pool while the water is being heated.

It is to be understood that variations and modifications of the present invention may be made without departing from the scope of the invention. It is also to be understood that the scope of the invention is not to be interpreted or limited to the specific embodiments disclosed herein but only in accordance with the appended claims when read in light of the foregoing disclosure.

I claim:

1. An inflatable solar collector for heating a swimming pool comprising:
    a plurality of individual solar heating sections;
    each of said sections having an upper portion which is transparent or translucent and a lower portion having an internal surface which absorbs solar energy, said lower portion being connected to said upper portion to provide a substantially enclosed intermediate dead air space;
    said sections having a major plane which is substantially parallel to the surface of the water in the pool;
    when inflated, said upper portions intersecting said plane at at least two locations such that the angles formed by the intersections of said upper surface with said plane are about 40° to 70°;
    a plurality of tabs interconnecting said sections and providing air passageways therebetween; and
    inflating means to permit said sections to become inflatable by gas pressure, said collector when inflated being floatable on the water surface.

2. The solar collector of claim 1 wherein said solar energy-absorbing surface is black and has a matte finish.

3. The solar collector of claim 1 wherein said upper and lower portions are formed of lightweight plastic.

4. The solar collector of claim 3 wherein said plastic is polyvinyl chloride.

5. The solar collector of claim 1 wherein said lower portion has sections adjacent to the intersection with said plane which are substantially parallel to opposing sections of said upper portion which intersect said plane.

6. The solar collector of claim 5 wherein said upper and lower portions have generally triangular shapes.

7. The solar collector of claim 1 wherein said inflating means comprise at least one air valve.

8. The solar collector of claim 1 including positioning means capable of securing said collector at a desired location on the surface of the water.

9. The solar collector of claim 8 wherein said positioning means comprise at least one eyelet integral with said collector.

10. The combination of a swimming pool filled with water and a plurality of the inflatable solar collectors of claim 1 floating on the surface of the water.

* * * * *